Figure 1A:
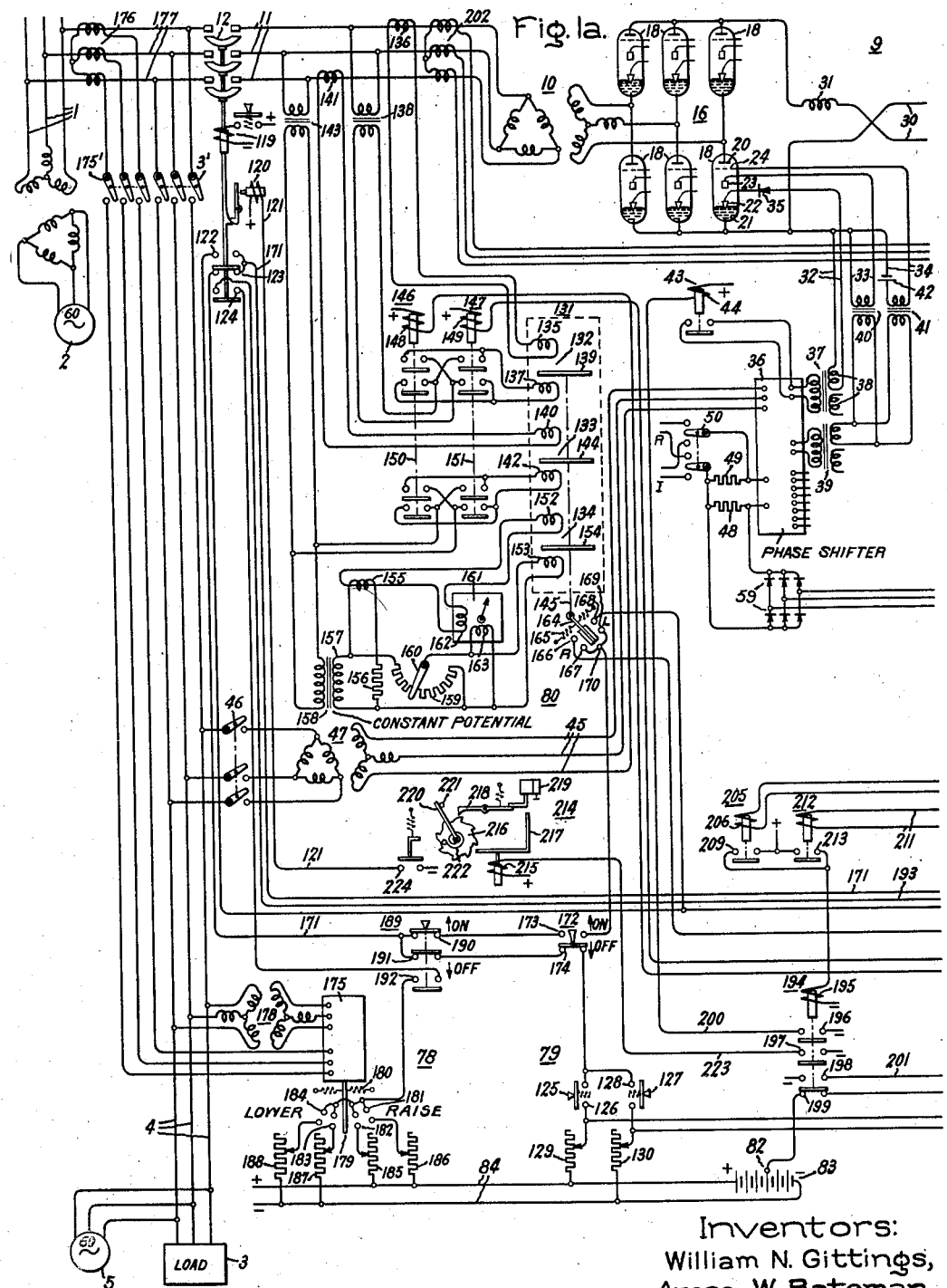

Sept. 3, 1946. W. N. GITTINGS ET AL 2,407,072
ELECTRIC CONTROL SYSTEM
Filed Oct. 24, 1944 4 Sheets-Sheet 1

Inventors:
William N. Gittings,
Amos W. Bateman,
by Harry E. Dunham
Their Attorney.

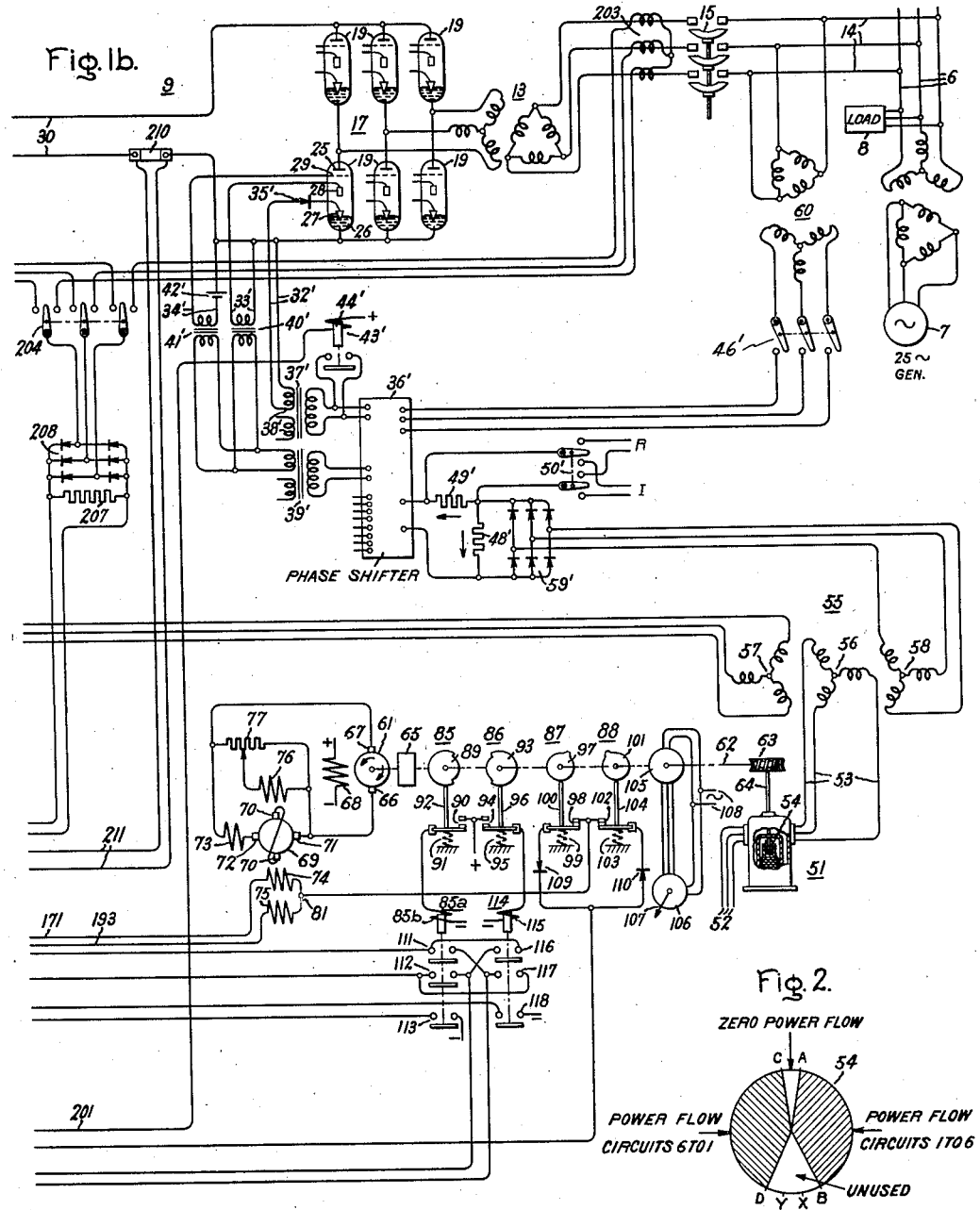

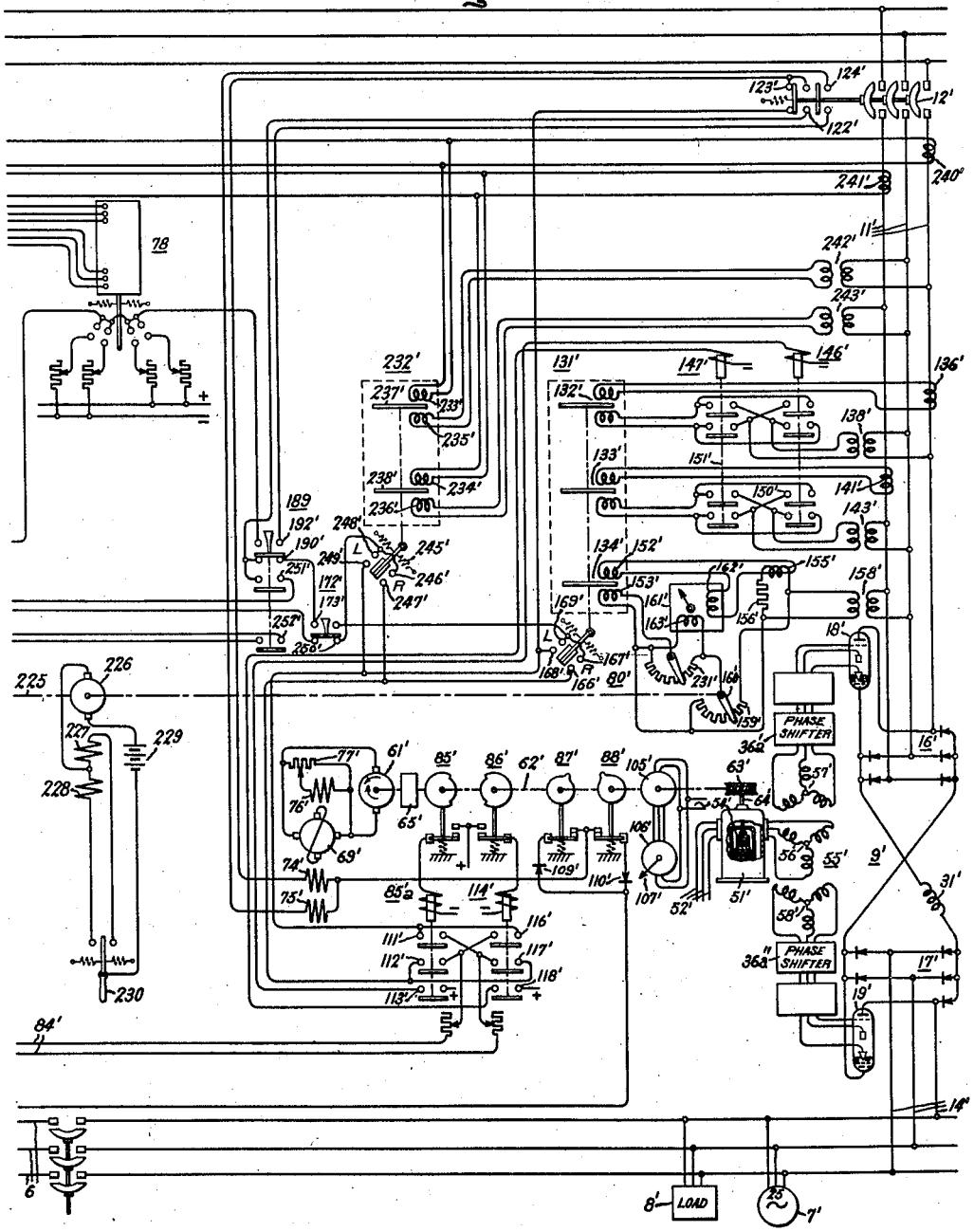

Patented Sept. 3, 1946

2,407,072

UNITED STATES PATENT OFFICE 2,407,072

ELECTRIC CONTROL SYSTEM

William N. Gittings, Oakmont, and Amos W. Bateman, Yeadon, Pa., assignors to General Electric Company, a corporation of New York Application October 24, 1944, Serial No. 560,161

32 Claims. (Cl. 171—97)

Our invention relates to electric control systems and more particularly to electric control and regulating systems for power conversion systems.

In order to illustrate our invention, we will describe suitable apparatus for carrying it into effect in an electronic conversion system but it will, of course, be understood that our invention in its broader aspects is not limited to the particular application described but is generally applicable, in whole or in part, to various systems of control or regulation in other electric systems.

A type of electronic power conversion equipment to which our present invention is applicable is that type sometimes known in the art as a dual conversion system wherein the power from an alternating current supply circuit is rectified by a group of tube rectifiers, transmitted as direct current over a direct current loop to a group of tube inverters which, in turn, deliver power of the same frequency as the supply circuit, or of a different frequency, to an alternating current load circuit. Such apparatus may be used to interconnect two electrical systems and may be classified as a system tie, a frequency changer, or a direct current transmission system, depending upon the principal function performed by the conversion apparatus.

In such systems it is usually required that the power flow be reversible at will and that it be possible to adjust the flow of power to any desired value in either direction. Thus, various regulating and control means including selective control of dynamo-electric machines and switchgear are involved in carrying out our invention.

It is an object of our invention to provide a new and improved electric control and regulating system.

It is another object of our invention to provide a new and improved regulating system for electronic power conversion apparatus interconnecting two alternating current systems which will enable the power interchanged between such systems to be controlled at any desired value for either direction of power flow.

It is another object of our invention to provide new and improved control and regulating means for dynamoelectric machines.

It is another object of our invention to provide new and improved regulating means in an electric control and regulating system.

It is another object of our invention to provide a new and improved control system for a plurality of electronic power conversion units operated for interchange of power between two alternating current systems.

It is a further object of our invention to provide new and improved fault control and protective means in an electronic conversion system.

Our invention will be better understood from the following description taken in connection with the accompanying drawings, and its scope will be pointed out in the appended claims.

Figure 3A:
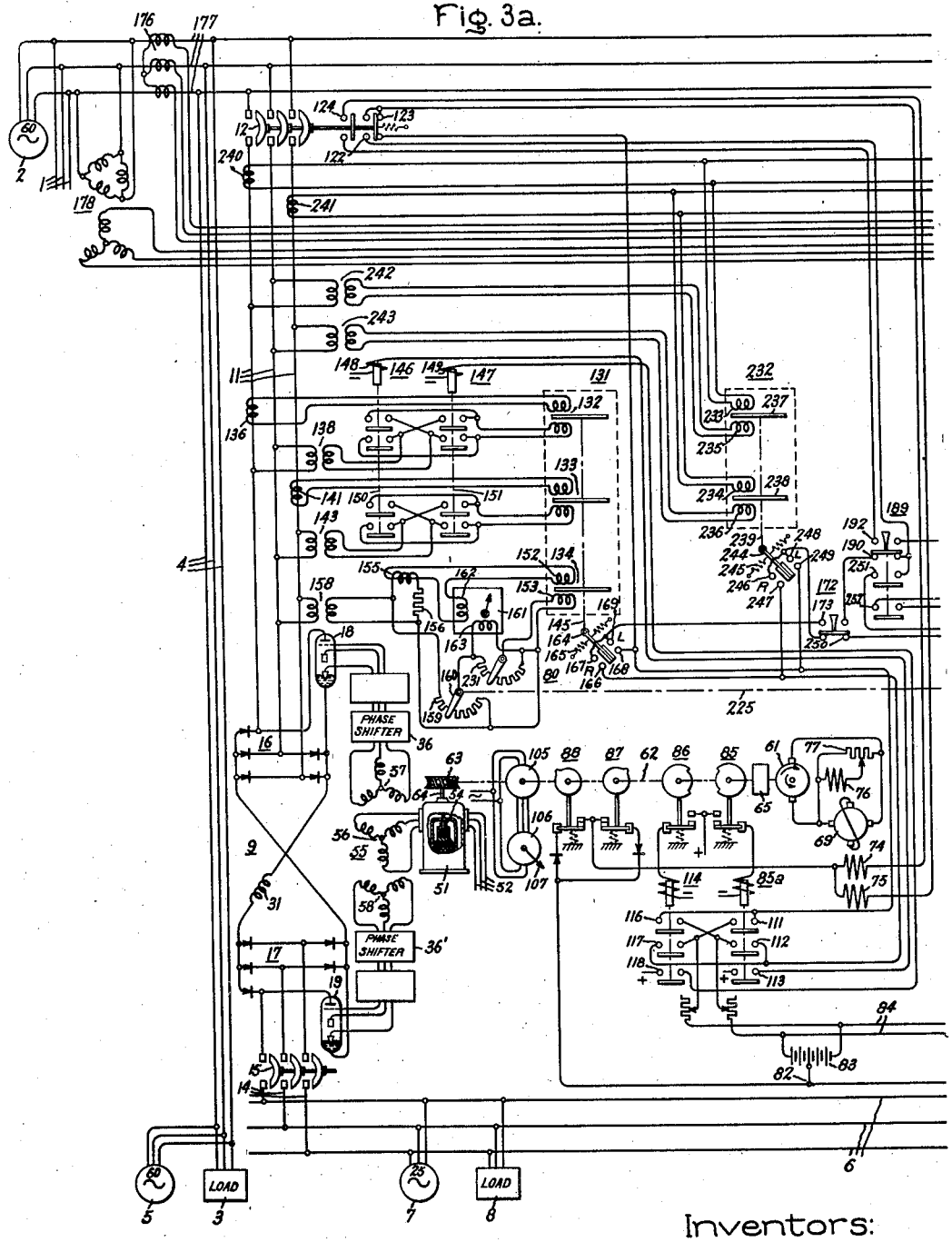

In the accompanying drawings, Fig. 1a and Fig. 1b are, respectively, a first and second section of a diagrammatic illustration of one embodiment of our invention in an electronic conversion system of the dual conversion type; Fig. 2 is an explanatory diagram, and Fig. 3a and Fig. 3b are, respectively, a first and second section of a modification of the invention illustrated in Fig. 1a and Fig. 1b and illustrates the control of a plurality of electronic conversion units.

Referring now to Figs. 1a and 1b, we have indicated an electronic power conversion system in a simple schematic form since the particular arrangement and features of the electronic power circuits per se, as distinguished from switching and control circuits, do not form a part of our invention. A satisfactory arrangement of the electronic power circuits for commercial purposes in described and claimed in an application of August Schmidt, Jr., Serial No. 539,939, filed June 12, 1944, and assigned to the assignee of the present application.

In the system as illustrated in Figs. 1a and 1b, we have shown one alternating current system 1 connected to be energized by a dynamo-electric machine 2. Such a system may be taken as representative of a public utility 60 cycle system which supplies power to an industrial customer. An industrial load, indicated by the rectangular outline 3, is connected to be energized from a supply circuit 4 which, in turn, is connected through a switch 3' to the system 1. It may also be assumed that the industrial customer has local 60 cycle generators, indicated by generator 5, which also feed power to the circuit 4 to assist in supplying power to load 3. A second alternating current circuit 6 is shown at the opposite end of the system with a dynamo-electric generator 7 and an industrial load 8. For purposes of illustration, the circuit 6 and the connected apparatus may be taken to represent a 25 cycle alternating current system of an industrial customer. The two alternating current systems, namely the assumed 60 cycle system 1 and the assumed 25 cycle system 6, are interconnected by electronic power conversion equipment, indicated generally by the numeral 9, which is arranged to transfer power in either direction between the two alternating current systems 1 and 6.

The electronic power conversion apparatus 9 is interconnected with the alternating current system 1 through transforming means 10, bus 11 and suitable circuit interrupting means 12, and is similarly connected to circuit 6 through transforming means 13, bus 14 and suitable circuit interrupting means 15.

The electronic conversion apparatus 9 comprises two converter tube groups 16 and 17 shown in a very simple form and each comprising a group of six tubes connected in a three-phase double-way (full wave) circuit. A particular arrangement of transformers and tube groups suitable for a commercial arrangement is shown and described in the above-identified Schmidt application. In the simple arrangement illustrated herein, the tube group 16 comprises six tubes 18 in which tubes 180 degrees apart in phase position are mounted back-to-back with the cathode of the upper tube connected to the anode of the tube below it, as viewed in the drawings. Similarly, the tube group 17 comprises six tubes 19 connected in a three-phase double-way circuit in which the tubes 180 degrees apart in phase position are mounted back-to-back. We have illustrated the tubes as being of the ignitron type although our invention is not limited to applications involving tubes of any particular type. Each of the several tubes 18 of group 16, as illustrated, is provided with an anode 20, a mercury pool cathode 21, an immersion ignitor or arc initiating member 22, a holding anode 23 and a control electrode or grid 24 to determine the instant of conduction in each tube in the proper sequence for rectification or inversion. Similarly, the several tubes 19 of tube group 17 are provided with an anode 25, a cathode 26, an immersion-ignitor or arc initiating member 27, a holding anode 28 and a control electrode or grid 29. The direct current terminals of the tube groups 16 and 17 are interconnected by a direct current loop circuit 30 having interposed therein a direct current reactor 31 to suppress voltage ripple in the direct current circuit.

Each of the tube groups is furnished with suitable excitation circuits for each ignitor, holding anode, and control electrode but since the particular form or details of the excitation circuits do not form a part of our invention, we have illustrated these circuits in a very schematic form. Thus each tube 18 of conversion unit 16 would be provided with excitation circuits indicated by the cathode-ignitor circuit 32, the holding anode circuit 33 and the grid circuit 34 connected to the several electrodes of the lower right-hand tube 18 of group 16, as viewed in the drawings. Unidirectional conducting devices 35 and 35' are connected in circuit with ignitors 22 and 27, respectively, in a conventional manner. These circuits are arranged to be energized from suitable excitation means indicated by the rectangular symbol 36 with a notation "phase shifter" which would include the necessary transformers, reactors and other elements utilized in excitation circuits of this type. The ignitor circuit 32 comprises an output transformer 37 having a pair of secondary windings 38 which are connected, respectively, to tubes 18 displaced 180 electrical degrees. Similarly, the holding anode circuits 33 and grid circuits 34 are supplied from an output transformer 39 having a pair of secondary windings for the associated pair of tubes. The holding anode circuit 33 is supplied through an insulating transformer 40 and the grid circuit 34 is supplied through a peaker transformer 41 and includes a bias means 42. An ignitor short-circuiting switch 43 having an operating coil 44 is provided to short-circuit the ignitor transformers for the purpose and in the manner to be described later. A suitable form of ignitor and grid control circuits, in accordance with the schematic arrangement disclosed, is described and claimed in an application of B. D. Bedford, S. No. 539,941, filed June 12, 1944, and assigned to the assignee of the present application. The excitation circuits are arranged to be supplied from a source of alternating current which is correlated in phase and frequency with the alternating current circuit associated with tube group 16. As illustrated, the excitation circuit means 36 is connected to be energized from the circuit 4 through circuit 45 having therein a suitable switch 46 and transformer 47. The device 36 includes a phase shifting means which is controlled in accordance with the differential voltage between an adjustable fixed component of voltage introduced from a resistor 48 and a variable component of voltage depending upon an electrical condition of tube group 16 operating either as a rectifier or an inverter. The variable component of voltage is introduced in the input circuit of device 36 by resistor 49 which is connected by the switch 50 to be energized in accordance with an electrical condition of the tube group 16 operating either as a rectifier or inverter, as indicated by the R and I positions of switch 50. A shift in the phase relation between the various control electrodes and the associated anodes is utilized to obtain the desired power flow between circuits 1 and 6 in the manner to be described later. A suitable and commercially satisfactory form of phase shifter and control apparatus, in accordance with the schematic form illustrated, is of the type described and claimed in an application of B. D. Bedford, Serial No. 539,942, filed June 12, 1944, and assigned to the assignee of the present application. In the form of phase shifter disclosed in this Bedford application a voltage component variable in accordance with an electrical condition of the tube group 16 or 17, such as the current input thereto, constitutes the variable signal voltage and is compared with an adjustable reference voltage which is indicated in the accompanying drawings by the voltage drop across the resistor 48. This reference voltage may be obtained from a well known form of three phase induction regulator 51 connected to be energized from an input circuit 52 and having its usual series and shunt windings connected in a manner to provide an output voltage across its output circuit 53 which is variable in magnitude in accordance with the position of its rotatable element 54. The output circuit 53 is connected to energize a transformer 55 having a primary winding 56 and two secondary windings 57 and 58. The voltage of secondary winding 57 is rectified by a suitable rectifier 59 and impressed across the resistor 48.

Similarly to tube group 16, each tube 19 of tube group 17 is provided with ignitor, holding anode and grid control excitation as indicated by the circuits 32', 33' and 34', respectively, leading from the excitation means 36'. This excitation means is energized from the bus 14, the alternating current circuit associated with tube group 17, through a transformer 60. A switch 43' having an operating coil 44' is arranged for short-circuiting the ignitor transformer 37' in the same manner as has been illustrated for ignitor transformer 37 of tube group 16. The signal voltage, variable in accordance with an electrical condition of the tube group 17, is introduced into the phase shifter by resistor 49' and switch 50'. An adjustable reference component of voltage is derived from secondary winding 53 through rectifier 59' having its direct current terminal connected across resistor 48'.

Although we have illustrated schematically a particular form of means for effecting phase shift by adjusting a reference voltage correlated with a variable component so that phase shift in one direction or the other is effected, depending upon the resultant between the two voltage components, it will be evident to those skilled in the art that our invention in its broader aspects may be carried out in response to a variable element which effects a phase shift directly or indirectly between two voltages as a result of the movement of a movable element in response to the condition to be regulated.

As fully explained in the above-identified Bedford application S. No. 539,942, the desired load on the electronic conversion unit, in accordance with the means herein illustrated, is set by the induction regulator 51 in accordance with the reference voltage obtained across resistor 48 or 48' which is proportional to the rotation of rotor 54. Generally speaking, if unit 16 is operating as a rectifier, unit 17 will then be operating as an inverter. The grids of tubes 18 of the rectifier will then be advanced from a predetermined lagging phase position toward an in-phase or actually to an in-phase position to obtain maximum power flow from circuit 1 to circuit 6. At the same time, the grids of the inverter tubes 19 will be operated in an advance position from a predetermined minimum advance position for inverter operation to a greater advance position to maintain the desired commutating angle required for deionization. For reverse power flow, the tube group 17 would be similarly operated as a rectifier and the tube group 16 would then be operated as an inverter.

In Fig. 2 we have shown a simple diagram which illustrates, in a general way, the power flow in the conversion system. Rotation of the rotor 54 from A to B or from C to D represents increase in power flow from zero to maximum for either direction of power flow as indicated.

In accordance with our invention, we provide an electric control and regulating means which effects control of the power flow in the electronic conversion system in either direction. In accordance with the illustrated embodiment of Figs. 1a and 1b, we provide a direct current motor 61 for operating the rotor 54 through a suitable shaft 62 and suitable gearing 63 which, in turn, is connected through a suitable shaft 64 to the rotatable element 54 of the induction regulator 51. Between the motor 61 and shaft 62 we have found it to be desirable to utilize a high ratio gearing 65 in order to reduce the speed ratio between the motor and the rotor 54. The motor 61 is provided with load brushes 66 and 67 and a field winding 68 which is separately energized from a constant source of voltage indicated by the plus and minus signs. With this arrangement the magnitude and polarity of the voltage impressed upon the armature brushes 66 and 67 will determine the direction and speed of rotation of motor 61 and consequently the direction and speed of rotation of rotor 54. Hence, a reversible polarity direct current generator 69 is utilized to energize the armature winding of motor 61. Although various types of generators having the proper characteristics may be used, we have found it preferable to use a generator of the armature reaction excited type, known in the art as an amplidyne generator, and described and claimed in U. S. Letters Patent No. 2,227,992, granted June 24, 1939, upon an application of M. A. Edwards and E. F. W. Alexanderson. The amplidyne generator is a preferred form because its low excitation requirements permit the use of relay and control switch contacts directly in its field circuits owing to the fact that the control field currents may be as low as 0.1 ampere for a generator terminal voltage of 300 volts and the resistance of the field circuits is low compared with that of conventional generator field circuits. The use of a reversible voltage generator to energize the motor 61 permits the motor to be reversed without reversing contactors; permits easy adjustment of the motor armature voltage magnitudes; permits the use of simplified control circuits; and provides inherent dynamic braking. The generator 69 has a pair of short circuit brushes 70 for providing the main armature reaction excitation of the machine and a pair of load brushes 71 and 72 which are in quadrature relation with the short circuit brushes 70. The generator is provided with a compensating winding 73 in circuit with the load circuit brushes 71 and 72 which substantially neutralizes the armature reaction of the generator along the axis of brushes 71 and 72. The load brushes 71 and 72 are connected to the armature brushes 66 and 67 of motor 61. The amplidyne generator is provided with three other field windings in addition to the compensating field winding 56. Two of these field windings 74 and 75 may be referred to as control field windings and the remaining field winding 76 is used as an anti-hunt and residual voltage killing field winding and is connected in shunt to the armature winding through an adjustable resistor 77. The polarities of the field windings are such that with current flowing from left to right of the field winding, the right-hand load brush 71 is assumed to be positive with respect to the left-hand brush 72. When brush 71 is positive, the motor 61 is assumed to be rotated in the direction which causes the induction regulator rotor 54 to increase the power flow from the circuit 1 to the circuit 6. For ease of identification, we have heretofore referred to circuit 1 as a 60 cycle system and circuit 6 as a 25 cycle system. In this event, tube group 16 will be operating as a rectifier and tube group 17 as an inverter. To obtain an increase in power flow from the 25 cycle system to the 60 cycle system, the rotation of the motor 61 is reversed by having the current in the generator field 74 or 75 flow from right to left. Control field 75 is used only with a "demand load" regulator 78 and control field 74 is used with either a manual control 79 or with a "watt regulator" control 80, all to be described presently. The control fields 74 and 75 have a common terminal 81 which is connected to a mid-voltage or neutral tap 82 of a suitable source of direct current such as a battery 83, although it will be obvious that conventional forms of midtapped rectifiers could be used without departing from our invention in its broader aspects. The other ends of the field windings 74 and 75 are connected through control contacts to be described presently to either end of the source 83 by means of an auxiliary control bus 84 so as to provide a simple means of obtaining current flow in either direction in the field windings.

Cam operated position switches 85, 86, 87 and 88 are operated from the shaft 62 of the motor 61 in order to provide the desired control relative to the position of the rotor 54 of the induction regulator 51. Position switch 85 includes a suitably shaped cam member 89, switch contacts 90, switch biasing means 91 and contact operating means 92 which may take the form of a rod positioned to engage the operating surface of cam 89. The surface of cam 89 is so designed that contacts 90 will be closed for motion of motor 61 for substantially 165 mechanical degrees in a clockwise direction from a substantially twelve o'clock position or zero position corresponding to point A of Fig. 2 to, say, a five-thirty position corresponding to point X of Fig. 2. For the remainder of the circumference of the cam 89, contacts 90 are in the open position. During this clockwise movement of cam 89, power flow of the conversion system is assumed to be effected from the 60 cycle system (circuit 1) to the 25 cycle system (circuit 6). Position switch 86 similarly includes a suitably shaped cam 93, switch contacts 94, switch biasing means 95 and a contact operating means 96. The surface of cam 93 is so designed that contacts 94 will be closed for motion of motor 61 for substantially 165 degrees in a counterclockwise direction from a substantially twelve o'clock position, or zero position, corresponding to point C of Fig. 2 to a six-thirty position corresponding to point Y of Fig. 2. For the remainder of the circumference of cam 93, the contacts 94 are in the open position. Position switch 87 is a limit switch and includes a cam 97, switch contacts 98, switch biasing means 99 and a contact operating means 100. The contacts 98 are arranged to be closed for a counterclockwise motion of motor 61 beginning from a substantially five o'clock position corresponding to point B of Fig. 2 to a five-thirty position approached from the counterclockwise direction corresponding to point X of Fig. 2. In other words, contacts 98 are closed at all times except when the rotor 54 reaches the end of its travel in the 60 to 25 cycle power flow direction (clockwise) at which point the contacts 98 open. Position switch 88 is also a limit switch and includes a cam 101, switch contacts 102, switch biasing means 103 and a contact operating means 104. The contacts 102 are arranged to be closed for a clockwise motion of motor 61 beginning from a substantially seven o'clock position corresponding to point D of Fig. 2 to a six-thirty position approached from a clockwise direction and corresponding to point Y of Fig. 2. In other words, contacts 102 are closed at all times except when rotor 54 reaches the end of its intended travel in the 25 to 60 cycle power flow direction (counterclockwise) at which point the contacts 102 open.

Indication of the position of the rotor 54 is obtained by mounting a Selsyn transmitter 105 on the shaft 62 and connecting the output of the transmitter to a Selsyn receiver 106 provided with position indicating means 107 and located at any convenient point for observation. The source of supply for the Selsyn indicator is indicated by conductors 108 of an auxiliary source of alternating current.

The contacts 98 and 102 of the two limit switches 87 and 88 are connected in series with unidirectional conducting devices, such as contact rectifiers 109 and 110, which are poled oppositely with respect to current flow from the midtap 82 of battery 83 so that in combination with their associated limit switches the field windings 74 and 75 are blocked against current flow which would run the rotor 54 past either limit of its travel.

An auxiliary relay 85a having an operating coil 85b and three sets of contacts 111, 112 and 113 is associated with and controlled by position switch 85 so that the relay contacts are picked up for power flow from the 60 cycle system to the 25 cycle system, or from position A to position B in Fig. 2. Similarly, an auxiliary relay 114 having an operating coil 115 and three sets of contacts 116, 117 and 118 is associated with and controlled by position switch 86 so that the relay contacts are picked up for power flow from the 25 cycle system to the 60 cycle system, or from position C to D in Fig. 2. Position switches 85 and 86 have their respective contacts 90 and 94 both open for a small portion of travel by the rotor 54 at the zero power flow position as indicated between A and C, Fig. 2. At the zero position of rotor 54, therefore, both auxiliary relays 109 and 114 are dropped out and all the contacts of the respective relays are in the open position. The use of the auxiliary relays 85a and 114 will be described later.

The circuit interrupting device 12 is provided with any suitable circuit closing means 119 and circuit opening means 120. The circuit opening means 120 may be made responsive to overcurrent conditions of the alternating current circuit of the conversion unit 16 in a conventional manner but, in accordance with our invention, we provide an additional circuit 121 for energization in response to special fault conditions to be described later. The circuit interrupting device 12 is also provided with auxiliary circuit controlling contacts 122, 123 and 124 which are shown, for the open position of the circuit interrupting device 12, with contacts 122 and 124 open, and contacts 123 closed. In order to simplify the drawings, each of the contacts 122, 123 and 124 may be considered to represent two contacts in series, one contact for the 60 cycle end as shown and one corresponding contact for the circuit interrupter 15 of the 25 cycle end.

The rotor 54 of the induction regulator 51 is always in the position represented for zero power flow at the time the 60 cycle and 25 cycle circuit interrupts are closed. In the open position of circuit interrupters 12 and 15, as illustrated, which would also result if the circuit interrupters were tripped while the conversion apparatus was carrying load, the rotor 54 is automatically returned to the zero position corresponding to points A to C of Fig. 2 for zero power flow. This is accomplished by the auxiliary contacts 123 of circuit interrupter 12 which connects the control field winding 74, through contacts 111 or 116 of auxiliary relays 85a or 114, to the polarity of battery 83 which causes the motor 61 to drive rotor 54 towards its zero power flow position. As the rotor 54 arrives at a position corresponding to point A or C of Fig. 2, the relay 85a or 114 is deenergized and the rotor 54 remains in the zero power flow position.

Manual control of power flow through the conversion apparatus is effected by means of the manual control apparatus 79 comprising a push button switch 125 with normally open contacts 126 for one direction of control, and a second push button switch 127 with normally open contacts 128 for the opposite direction of control. The switch 125 has its contacts 126 connected in series relation with an adjustable resistor 129 to the positive conductor of control bus 84, and switch 127 has its contacts 128 connected to the negative conductor of control bus 84 through an adjustable resistor 130. The magnitude of the current in the control field 74 and thus the speed at which the rotor 54 adjusts load setting is readily adjusted by the resistors 129 and 130. With circuit interrupters 12 and 15 in the closed position, interlocking contacts 122 are closed so that upon closure of manual control switch 125 the left-hand end of field winding 74 is connected to the positive side of control bus 84 while the right-hand terminal is connected through the contact 98 of auxiliary switch 87 and through rectifier 109 to the midtap of battery 82. This circuit effects energization of field winding 74 in a direction to cause rotor 54 to be operated in a clockwise direction from A to X, Fig. 2, and thus increase power flow from the 60 cycle system (circuit 1) to the 25 cycle system (circuit 6). On the other hand, closure of manual control switch 127 connects the negative conductor of bus 84 through circuit interrupter interlock contacts 122 to the left-hand terminal of field winding 74 while the right-hand terminal thereof is connected through contact 102 of auxiliary position switch 88 and the rectifier 110 to the more positive midtap terminal 82 of battery 83. It will be observed that the polarity of field winding 74 has been reversed so that the motor 61 and hence rotor 54 would be operated in the reverse direction to cause an increase in power flow from the 25 cycle system to the 60 cycle system.

The first type of automatic control previously mentioned and identified in whole as device 80 may be referred to as "watt regulator" control. This control is effected by means of an induction disc type device 131 comprising three watt responsive elements 132, 133 and 134. The elements 132 and 133 are connected in a manner similar to a conventional two-element three-phase three-wire wattmeter. Thus element 132 is provided with a current coil 135 connected to be energized in accordance with the upper phase conductor of circuit 11 through a current transformer 136. This element is also provided with a voltage coil 137 connected to be energized in accordance wtih the voltage of the upper two phase conductors of circuit 11 through a potential transformer 138. The current winding 135 and voltage winding 137 are arranged in cooperative relation with an induction disc 139 to provide a torque proportional to the watts in this element. The element 133 is provided with a current coil 140 connected to be energized in accordance with the current in the lower phase conductor of circuit 11 through a current transformer 141. This element is also provided with a voltage coil 142 connected to be energized in accordance with the voltage of the lower two phase conductors of circuit 11 through a potential transformer 143. The current coil 140 and voltage coil 142 are arranged in cooperative relation with an induction disc 144 to provide a torque proportional to the watts in this element. The induction discs 139 and 144 are mounted on a common shaft 145. In order to maintain the correct direction of torque on the "watt regulator" relay 131 for different directions of power flow, we have found it expedient to reverse the connections of the potential coils 137 and 142. As illustrated, auxiliary reversing relays 146 and 147 are interposed between potential transformer 138 and its associated voltage coil 137 of element 132. Relay 146 is provided with an operating coil 148 which is connected to be energized in accordance with the operation of position relay 85a which, in turn, is controlled in accordance with the cam operated position switch 85 controlling power flow from circuit 1 to circuit 6. Relay 147 is provided with an operating coil 149 which is connected to be energized in accordance with the operation of position relay 114 which, in turn, is controlled in accordance with the cam operated position switch 86 which controls power flow in the reverse direction, namely, from circuit 6 to circuit 1. Similarly, auxiliary reversing relays 150 and 151 are interposed between potential transformer 143 and its associated voltage coil 142 of element 133. Relays 146 and 150 are arranged to be operated simultaneously by the operating coil 148, while relays 147 and 151 are arranged to be operated simultaneously by the operating coil 149. The two relay elements 132 and 133 may be constructed in accordance with the principles of conventional and well known types of induction disc relays.

The third element of the "watt regulator" 131 is provided as a calibrating element and comprises a current winding 152 and a voltage winding 153 which are arranged in cooperative relation with an induction disc 154 also mounted on the shaft 145. The current coil 152 is arranged to be energized with constant current and, as illustrated, is connected to be energized from a current transformer 155. The current transformer is connected in series relation with a resistor 156 across a secondary winding 157 of a constant potential transformer 158. An adjustable resistor or voltage divider 159 is also connected across the secondary winding 157 of the constant potential transformer and is provided with an adjusting arm 160. One terminal of the potential coil 153 is connected to the adjusting arm 160 and the other terminal is connected to the other side of the constant potential transformer. The voltage of the potential coil 153 is, therefore, variable between zero and full voltage of the transformer 158. By changing the setting of arm 160, it is possible to vary the torque producing watts in the calibrating element from zero to some predetermined value depending upon the constants of the circuit. The torque of calibrating element 134 acts in the same direction as the torque of elements 132 and 133. An indicating wattmeter 161, comprising a current coil 162 in circuit with current coil 152 and a voltage coil 163 responsive to the same voltage as voltage coil 153, indicates the watts input to the calibrating element 134 so that the indicating wattmeter may be calibrated to read directly the "watt regulator" setting.

The several contacts and cooperating auxiliary relays of the "watt regulator apparatus" 80 may now be considered. The shaft 145 of the "watt regulator" device 131 per se is provided with a movable contact arm 164 which may be biased by suitable biasing means 165 to a position intermediate two pairs of cooperating contacts 166 and 167 and 168 and 169. Contact 166 is connected to contacts 112 and 117 of auxiliary relays 85a and 114, respectively, while contact 168 is connected to contacts 111 and 116 of auxiliary relays 85a and 114, respectively. Contacts 167 and 169 have a common junction 170 which is connected through a conductor 171 to the left-hand terminal of field winding 74 of amplidyne generator 69. A switch 172 which may be referred to as a "watt regulator" transfer switch is connected in circuit with conductor 171. Switch 172, which may be automatically operated, is shown, for purposes of simplicity, as a manually operated switch and comprises one set of contacts 173 and a second set of contacts 174. The contacts 173 are open and the contacts 174 are closed when the switch is in one operating position such as the lower or "off" position as illustrated in the drawings. In the upper operating position or "on" position, as illustrated in the drawings, contacts 173 are closed and the contacts 174 are open. Contacts 173 are connected in series with conductor 171 and places this circuit under control of the "watt regulator" 80. Contacts 174 are connected in series with the contacts 126 and 128 of the previously described manual control switches 125 and 127, respectively. In all cases under "watt regulator" control, the desired direction of power flow must first be selected manually by the operator by means of switch 125 or 127. We may continue to trace the circuit of conductor 171 through closed contacts to be described presently through interlocking circuit interrupter contacts 122, which are closed when the power circuit interrupters 12 and 15 are closed, to the left-hand terminal of control field winding 74.

The regulator 78 may be referred to as a "demand load regulator" and for purposes of illustration may be assumed to be an indicating-integrating device designed to hold kilowatt hour demand practically constant at a predetermined value and at the same time hold the instantaneous kilowatt value within desired limits. Under the assumed system of connections generally outlined hereinbefore, it will be observed that there are three sources of power available for the industrial customer's load 3, (a) the public utility 60 cycle system indicated by circuit 1, (b) the industrial customer's 60 cycle generators indicated by generator 5 and (c) the industrial customer's 25 cycle generators indicated by generator 7 feeding into bus 6. The electronic conversion apparatus 9 interconnects the 25 cycle system, circuit 6, and the 60 cycle system, circuit 1. The "demand load" regulator 78 is connected to respond to the net interchange of power between the public utility's 60 cycle system, circuit 1, and the power system of the industrial customer. The "demand load" regulator may be of a type commercially available in the art and it is believed sufficient for the purpose of disclosing our invention to indicate the regulating instrument per se by the rectangular symbol 175. The current element of the regulator 175 is energized through a switch 175' from current transformers 176 connected at the tie point 177 between circuit 1 and the connection point of the industrial customer's circuit 4 and electronic converter bus 11. The voltage element of the device 175 may be energized through a suitable potential transformer 178 connected to respond to the voltage at the tie point 177 or, as illustrated, may be connected to the bus 4 which has a voltage of predetermined phase, frequency and magnitude relative to the voltage of the tie point 177. The device 175 is provided with a movable contact arm 179 which is biased by suitable means 180 to a position intermediate two groups of contacts 181 and 182 constituting one group and 183 and 184 constituting the second group. The outer limit contacts 181 and 184 may be identified as the "fast," "raise" and "lower" contacts, respectively, while contacts 182 and 183 may be identifier as the "slow," "raise" and "lower" contacts, respectively. The "raise" contacts 181 and 182 are connected through adjustable resistors 185 and 186, respectively, to the positive side of control bus 84. The "lower" contacts 183 and 184 are connected through adjustable resistors 187 and 188, respectively, to the negative side of control bus 84. Separate resistors for "raise" and "lower" speed adjustment are used since operating engineers may find it desirable to decrease the load setting at a faster rate than the load setting is increased, or vice versa.

To connect the "demand load" regulator into the control circuits heretofore described and at the same time switch out other circuits which might cause conflicting control, we provide a "demand load" regulator transfer switch 189. This switch is a two position switch and is provided with three sets of contacts 190, 191 and 192. In the lower or "off" position of switch 189, when the "demand load" regulator 78 is not intended to effect a controlling action, the contacts 190 and 191 are in a closed position. Contacts 190 are in series relation with conductor 171, making it possible for watt regulator 80 to exercise control, and contacts 191 make it possible for manual control to be exercised through manual control switch 79. When switch 189 is in its upper or "on" position, the contacts 190 and 191 are in the open position disabling both manual control 79 and watt control 80 and putting "demand load" regulator 78 in control. As previously pointed out, the "demand load" regulator 78 exercises its control through field winding 75 rather than field winding 74 which is utilized with manual control 79 and "watt regulator" 80. Thus, with contact 192 closed, a circuit can be completed from either the positive or negative conductor of control bus 84, depending upon the position of the regulator arm 179, through interlocking contacts 124 of circuit interrupters 12 and 15 through a conductor 193 to the left-hand terminal of winding 75. The right-hand terminal of winding 75 is connected through junction terminal 81, which in turn is connected through the contacts of limit switches 87 or 88 to the midtap 82 of battery 83.

The usual types of faults to which electronic rectifier apparatus is subjected, such as arcbacks, may be taken care of successfully by ignitor blocking in accordance with the system described and claimed in U. S. Letters Patent No. 2,348,653, granted May 9, 1944 upon an application of A. H. Mittag and assigned to the assignee of the present application. In the ignitor blocking system, means are provided to short circuit the ignitor firing impulses to an entire tube group. We have indicated such blocking for the ignitors of tube groups 16 and 17 by the ignitor blocking relays 43 and 43', respectively, heretofore described. The relays 43 and 43' are controlled by a fault responsive relay 194. The relay 194 is provided with an operating coil 195, three sets of normally open contacts 196, 197 and 198, and a normally closed set of contacts 199. The contacts 196 and 198 constitute the ignitor blocking control contacts and when closed cause energization relays 43 and 43', respectively, over control circuits 200 and 201, respectively, to short circuit the impulses to the ignitor. The contact 199 is connected in series with the conductor to the midtap 82 of control battery 83 so that upon closure of contacts 196 and 197 for ignitor blocking the control of the phase shifting apparatus will also be interrupted through the interruption of the control field windings of generator 69. For arc-back protection of each rectifier, it is satisfactory to use an instantaneous overcurrent relay responsive to the alternating current supply to the respective converters 16 and 17 operating as rectifiers. We may obtain this response from the current transformers 202 or 203 through selective switch 204 which permits connection of the fault responsive apparatus to whichever end of the converter is operating as a rectifier. Although various known types of overcurrent relays may be used, we have shown an overcurrent relay 205 provided with an operating coil 206 connected to be energized from a resistor 207 which, in turn, is energized through a full wave rectifier 208 having its input side connected by selective switch 204 to either transformer 202 or 203. Relay 205 is provided with normally open contacts 209 which when closed complete a control bus circuit indicated by the plus and minus signs to cause energization of operating coil 195 of the fault responsive relay 194.

Since an arc-back is also manifested in the direct current circuit of the electronic converter, we provide a current shunt 210 in the direct current loop 30 and through conductors 211 energize a second relay 212 having normally open contacts 213. The contacts 213 are connected in parallel relation with contacts 209 so that operation of either relay will cause energization of the ignitor blocking relays 43 and 43'. Relay 212 also affords protection for a fault condition of inverter operation which is reflected on the direct current circuit and which may not be reflected in the alternating current circuits of the conversion unit. Under certain fault conditions of the inverter, such as tube failures, misfire, or insufficient deionization time, two tubes connected back-to-back, such as the right-hand pair of tubes 18 in group 16, may be simultaneously conductive during inverter operation. This condition is known as a "shoot-through" and constitutes a short circuit on the direct current loop but may not result in abnormally high currents in the inverter transformer. In this case, the ignitor blocking relays 43 and 43' would be picked up by the operation of relay 212. Thus either an arc-back or an inverter shoot-through will be successfully cleared by the ignitor blocking relay.

In the case of repeated arc-backs or shoot-throughs, the fault suppression apparatus will merely suppress these faults as fast as they occur. However, it has been found desirable to disconnect the converter when the fault responsive means operates a predetermined number of times within a predetermined period of time. In accordance with our invention, we provide means for performing this function. For this purpose, we have illustrated a known form of notching relay 214 which is provided with an operating coil 215, a ratchet wheel 216, a reciprocating lever mechanism 217, a pawl 218, a delayed time release 219 for the pawl, and a contact arm 220 operated by the ratchet wheel. The contact arm is biased to predetermined starting position against stop 221 by spring 222. The operating coil 215 is connected to be energized from a control bus 223 through contact 197 of the ignitor blocking control relay 194 each time the ignitor blocking control relay is operated to its closed or upper position as illustrated in Fig. 1a of the drawings. When coil 215 of the notching relay is energized, it moves the mechanism 217 so as to notch the ratchet wheel 216 one notch in a counterclockwise direction and at the same time operates the time mechanism 219 to release the pawl 218 and thereby hold the ratchet wheel in the new position. If the number of impulses or energizations of coil 215 are sufficient to move contact arm 220 to a predetermined position before the predetermined time has elapsed, a pair of contacts 224 in series relation with conductor 121 are closed so that tripping mechanism 120 of circuit interrupter 12 will be energized and the circuit interrupter will be operated to its open position. Otherwise, if the frequency of occurrence of ignitor blocking is less than the predetermined time, the timing mechanism will reset pawl 218 to a releasing position and the contact arm will return to its biased position against stop 221 without effecting operation of the releasing mechanism 120 of circuit interrupter 12.

The operation of the embodiment of our invention illustrated in Figs. 1a and 1b is substantially as follows: The electronic conversion unit 9 is switched into service by closing the power circuit interrupters 12 and 15, thereby connecting the transformers 10 and 13 of the electronic converter unit to the systems 1 and 6, respectively. The switches 46 and 46' are closed to energize the excitation control units 36 and 36', and switch 3' is closed to interconnect the 60 cycle system 4 of the industrial customer with the 60 cycle system of the public utility system at the tie point 177. Switch 175' is closed to energize the potential coil of "demand load" regulator 175. The only prerequisite to putting the unit into service is that the excitation control units 36 and 36' for both ends of the converter be established for inverter operation. Since the operation of the various control and regulating devices has been described hereinbefore relative to their individual functions, it is believed an overall description of the operation of the system under control of the several control means will suffice for a clear understanding of the illustrated embodiment.

When the switching of the power circuits and auxiliary power circuits has been effected as outlined above, the power converter is ready for control of direction and magnitude of power flow. The operator has a choice of three types of control: manual control by device 19, "watt regulator" control by device 80 and "demand load" regulator control by device 78. The direction of power flow through the electronic converter 9 is determined by the connections of the phase shifting networks 36 and 36'. These connections are made by the R and I positions of switches 50 and 50'. When the switch 50 is moved to the I position, the phase shifting network 36 causes the tube group 16 to operate as an inverter, whereas when the switch 50 is moved to the R position the phase shifting network 36 causes the tube group 16 to operate as a rectifier. A corresponding operation is obtained with respect to switch 50' and its associated phase shifting network 36' and the tube group 17. Therefore, for example, to have power flow through the converter 9 from the 60 cycle system to the 25 cycle system, switch 50 would be moved to the R position and switch 50' would be moved to the I position. The magnitude of the power flow through the electronic converter 9 is determined by the magnitude of the reference voltage derived from induction regulator 51 by means of the resistors 48 and 48' associated with the phase shift networks 36 and 36'. This reference voltage is determined by the position of the rotor 54 of induction regulator 51 so that control of the rotation of the rotor 54 is the direct means by which power flow through the electronic converter 9 is controlled.

Manual control of power flow is by means of the simple double throw momentary contact control switch 79. Field winding 74 of amplidyne generator 69 is used for manual control. Thus if switch 125 is closed, the left-hand terminal of field winding 74 is connected to the positive terminal of control bus 84 through contacts 174, contacts 191, auxiliary contacts 122 of circuit interrupter 12, and through conductor 171. This direction of energization has been assumed to cause clockwise rotation of motor 61 and thereby effect an increase in power flow through the electronic converter from circuit 1 to circuit 6. The closure of switch 127 causes the reverse operation by connecting the left-hand terminal of field winding 74 to the negative terminal of bus 84. An operator, therefore, merely selects the desired position of control switch 79 to give the desired direction of power flow and the switch is held in that position until power flow has increased to the desired magnitude, such as may be indicated by any conventional wattmeter on the control board. It will be observed, however, that with current flow from left to right, in field winding 74 the path from the right-hand end or junction 81 to the battery neutral terminal 82 is through contact 98 of position switch 87 and rectifier 109. Thus when rotation of cam 97 has been effected in a clockwise direction to a point corresponding to point B in Fig. 2, the field circuit is interrupted by switch 98 and no further increase in power flow can be effected beyond the established limit by this means. A similar limit is established at point D, Fig. 2, for power flow in the reverse direction by means of switch 88 and its cam 101 which opens contact 102 in the circuit from neutral battery terminal 82 through rectifier 110.

The "watt regulator" 80 is a means for automatically regulating the power flow through the electronic converter 9. The power elements 132 and 133 are connected in the power circuit of the electronic converter in the manner described above with the potential coil reversing switches 148 and 149 arranged to connect the potential elements automatically and correctly in accordance with the operation of position switches 85 and 86. The regulator 80 has two sets of contacts; one set 168, 169, which has been identified as the "lower" set, is closed when the electronic converter power flow is greater than the regulator calibration, and another set of contacts 166, 167, which has been identified as the "raise" set, is closed when the electronic converter power is less than the regulator calibration. Both sets of contacts are open when the electronic converter power flow is equal to or within a predetermined percentage of the regulator calibration. Calibration is changed by the adjusting arm 160 of the calibrating resistor 159. The indicating instrument 161 may be arranged to indicate the calibration setting directly in kilowatts. In putting the electronic converter on "watt regulator" control, it is initially necessary for the operator to select direction of power flow by means of the manual switch 79. Once the rotor 54 of induction regulator 51 arrives at a position corresponding to position A or C in Fig. 2, the "watt regulator" transfer switch 172 is moved to its upper or "on" position closing contacts 173 and the "watt regulator" functions to pick up the load for which the regulator is set. This operation of the transfer switch 172 disconnects the manual control through the opening of contacts 174. It will be assumed that the operator has moved rotor 54 to a position corresponding to position A so that position switch 85 has been moved to close contacts 90 and power flow has been initiated through the electronic converter from circuit 1 to circuit 6. With the closure of contacts 90, auxiliary switch 85a is picked up and closes its contacts 111, 112 and 113. Contacts 111 connect the "lower" contact 168 to the negative conductor of control bus 84 and contacts 112 connect the "raise" contact 166 to the positive conductor of the control bus 84. With the power flow established through the converter from circuit 1 to circuit 6, it will be assumed that the power flowing is less than the setting of the "watt regulator". Its contact arm 164 would be moved to close "raise" contacts 166, 167, which results through contact 112, in connecting the left-hand terminal of field winding 74 to the positive terminal of control bus 84 and thus causes an increase in the power flow through the electronic converter from circuit 1 to circuit 6. The operation which follows when the power flow through the converter is greater than the "watt regulator" setting will be obvious as the lever 164 moves to close the "lower" contacts 168, 169 to reverse the polarity of field winding 74 and thereby reverse the direction of rotation of rotor 54 of induction regulator 51. A sequence of events similar to that just described will occur if the power flow is in the reverse direction through the converter. In this case contact 94 of position switch 86 will be closed resulting in picking up relay 114. This action reverses the connection of the potential coils of "watt regulator" 80 for the reverse power flow and at the same time reverses the connection of field winding 74 so that an increase in power flow is effected by a counterclockwise rotation of motor 61 and a decrease of power flow is effected by a clockwise rotation.

The "demand load regulator" is put into operation by moving the "demand regulator" transfer switch 189 to its "on" or upper position as illustrated in the drawings. At the same time, the "watt regulator" transfer switch 172 is moved to its "off" or lower position as illustrated in the drawings. With switch 189 in its "on" position, its contacts 190 and 191 are opened cutting out the "watt regulator" control and at the same time contacts 192 are closed connecting the demand regulator contacts 181 to 184 in condition for effecting control. The "demand load regulator" 78 permits the industrial customer to make the best possible exchange of kilowatt hours with the public utility system as determined by the customer's contract with the power company. When the 60 cycle industrial load 3 is greater than the setting of the regulator 78, the electronic power converter 9 is controlled to supply power from the customer's 25 cycle system, circuit 6, to the 60 cycle system. On the other hand, when the 60 cycle industrial load 3 is less than the setting of the regulator 78, the electronic power converter 9 is controlled to supply power from the 60 cycle system to the customer's 25 cycle system. This control is effected through field winding 75, rather than field winding 74, of the amplidyne generator 61. Assume that when the system is put under "demand load regulator" control the integrated load demand of the 60 cycle industrial load is below the setting of the regulator 78. These conditions require that the power flow to the industrial customer must increase and this is effected by causing the electronic converter to transmit power from the 60 cycle system to the 25 cycle system. Therefore, the movable arm 179 of the regulator 78 moves to close one of the "raise" contacts 182 or 181 and thereby connects the left-hand terminal of field winding 75 to the positive conductor of control bus 84. This connection results in a clockwise rotation of motor 61 and results in power flow from the 60 cycle system to the 25 cycle system in the direction desired. Conversely, if the integrated load is above the setting of the regulator 78 the contact arm 179 is moved to close one of the "lower" contacts 183 or 184 and thereby reverses the connections of field winding 75. This connection results in a counterclockwise rotation of motor 61 and results in power flow from the 25 cycle system to the 60 cycle system in the direction necessary to bring the integrated demand down to the setting of the "demand regulator."

In Figs. 3a and b, considered together, we have shown an embodiment of our invention arranged for controlling a system in which a plurality of electronic converters are utilized to interconnect the assumed 60 cycle and 25 cycle systems. The "demand load regulator" 78 of the single converter system is arranged to control both electronic converters, while means are provided to keep the loads on the two electronic converters approximately equal or in a predetermined ratio under these conditions of control. The arrangement also illustrates the system with "watt regulator" control for each electronic converter unit and with means for adjusting the calibration of each "watt regulator." Although the control circuits of each converter unit would be provided with the manual control 79, as illustrated in Figs. 1a and b, it has been omitted from the illustration of this embodiment in order to simplify the drawings. The various devices and elements of Figs. 3a and 3b corresponding to those of Figs. 1a and 1b and the electronic converter there shown have been assigned like reference numerals, whereas corresponding devices and elements of the additional electronic converters have been assigned like reference numerals which have been primed and in a few instances double primed where the devices were originally designated by a primed numeral.

The system as illustrated, therefore, comprises the assumed 60 cycle circuit 1 of the public utility, the 60 cycle system 4 of the industrial customer, both of which are interconnected with the 25 cycle system of the industrial customer which is indicated by circuit 6. In the arrangement as illustrated two electronic converter circuits, indicated by the buses 11 and 11' and including the electronic converters 9 and 9', interconnect the 60 cycle system and the 25 cycle system. Each of the electronic converters 9 and 9' is provided with control apparatus corresponding to the apparatus illustrated in Figs. 1a and b and except for the additional elements and devices which have been introduced in this modification, it is not believed that any further description is required for an understanding of the invention.

In connection with the "watt regulators" 89 and 89' means are provided to adjust the calibration of these regulators simultaneously and this may be accomplished through the calibrating rheostats 159 and 159' by means of a shaft 226 having the contact arms 160 and 160' mounted thereon. A reversible driving means, such as the reversible motor 226, is arranged to operate the shaft 225. The motor 226 may be any suitable form of reversible motor and for purposes of illustration is shown as a direct current motor with a split field winding comprising sections 227 and 228 connected to be selectively energized from a source of direct current 229 through a selector switch 230. The switch 230 may be located at any convenient point for purposes of remote control and in practice has been mounted on a control panel so that the operator can view the indicating wattmeters 161 and 161' and thereby determine by observation the desired calibration setting.

Each of the calibrating elements of the "watt regulators" 89 and 89' may be provided with a load balancing adjuster control which in the case of watt regulator 89 comprises an adjustable resistor 231 connected across the voltage coil 153 and similarly in watt regulator 89' an adjustable resistor 231' connected across the voltage coil 153'. This control is used only when the electronic converters are both under "watt regulator" control. Any unbalance of power on the two electronic converters can be corrected by properly adjusting resistors 231 and 231'. The load balance adjusters 231 and 231' should normally be in their zero resistance positions and if it is necessary to balance the load between the two electronic converters, the resistor for the unit carrying the smallest load need be the only resistor changed from the zero position.

When the electronic converters 9 and 9' are under control of the "demand load regulator" 78, it may be desirable to provide means to maintain automatically a predetermined division of load between the respective converters. For this purpose, we provide load balance relays 232 and 232', and for purposes of explanation it will be assumed that it is desired to maintain equal loads on the respective converters. The load balance relay 232 may be a conventional polyphase induction disc type relay with current coils 233 and 234 and voltage coils 235 and 236. The current and voltage coils 233 and 235 are arranged in cooperative relation with an induction disc 237 and the current and voltage coils 234 and 236 are similarly arranged in cooperative relation with an induction disc 238. The discs 237 and 238 are mounted on a common shaft 239. Load balance relay 232' is constructed in a similar manner with current and voltage coils 233' and 235' in cooperative relation with disc 237' and current and voltage coils 234' and 236' in cooperative relation with disc 238' with the discs mounted on a common shaft 239'. Current transformers 240 and 240' are connected, respectively, in the corresponding outside phase conductors of circuits 11 and 11' and are arranged in differential relation to energize current coils 233 and 233'. Similarly current transformers 241 and 241' are connected in the corresponding inside phase conductors of circuits 11 and 11' and are arranged in differential relation to energize current coils 234 and 234'. Voltage coil 235 is connected through a potential transformer 242 to the phase voltage of its associated current coil 233 of circuit 11 and voltage coil 236 is connected through potential transformer 243 to the phase voltage of its associated core coil 234. Voltage coils 235' and 236' are similarly connected to circuit 11' through potential transformers 242' and 243'. The shaft 239 of relay 232 is provided with a movable contact arm 244 biased by suitable means 245 to a position intermediate one pair of "raise" contacts 246 and 247 and a second pair of "lower" contacts 248 and 249. The shaft 239' of relay 232' is similarly constructed with a movable contact arm 244', bias means 245' and cooperating "raise" contacts 246'—247' and "lower" contacts 248'—249'. The interconnected or common contacts 246 and 248 of relay 232 are connected through a pair of contacts 250 which have been added to "watt regulator" transfer switch 172. By reason of the addition of the load balancing relays 232 and 232', additional contacts are required on the "demand load" transfer switches 189 and 189'. These contacts are identified as 251 and 252 on switch 189 and 251' and 252' on switch 189'. Thus from contacts 250 of watt transfer relay 172, the control circuit may be traced through contacts 252' of relay 189', through contacts 251 of relay 189, through contacts 122 of circuit interrupter 12 to the right-hand terminal of field winding 74 of amplidyne generator 69. Proceeding in the opposite direction from contacts 250 this right-hand terminal of winding 74 is then connected to the positive conductor of bus 84 through auxiliary relay 85a or the negative conductor of bus 84 through auxiliary relay 114, depending upon the operation of position switches 85 and 86 and whether the load balancing relay 232 is in its "raise" or "lower" position. The opposite or left-hand terminal of field winding 74 is conected through the limit switches 87 or 88 to the neutral terminal 82 of the battery 83. The left-hand terminal of field winding 74' of amplidyne generator 69' is similarly connected to the plus or minus conductor of bus 84, depending upon the operation of the position switches 85' and 86' and whether the load balance relay 232' is in its "raise" or "lower" position. The right-hand terminal of field winding 74' is connected through limit switches 87' or 88' to the neutral terminal 82 of battery 83. With equal loads on the respective electronic converters 9 and 9' and with the differential arrangement of the current transformers of the balance relays 232 and 232', no current flows in the current coils of either relay and the relays "float."

In analyzing the operation of relays 232 and 232', it is necessary to keep in mind that the motor 61, amplidyne generator 69 and the position switches in Fig. 3a are reversed in position, as illustrated, from that of the corresponding elements in Fig. 3b and also from the corresponding elements in Fig. 1b. Hence, it is necessary in Fig. 3a to reverse the convention in regard to effecting a decrease or increase in power flow between the respective alternating current circuits. The convention may be correctly kept in mind by considering a mirror image of Fig. 2 so that when power flow is from the 60 to 25 cycle system a counterclockwise rotation of position switch 85 effects an increase in power flow and a clockwise rotation a decrease. Conversely, when power flow is from the 25 to 60 cycle system, a clockwise rotation of position switch 86 effects an increase in power flow and a counterclockwise rotation a decrease. The convention with respect to the direction of rotation of motor 61 in relation to the direction of energization of field winding 74 remains the same since current flow from right to left is assumed to cause a counterclockwise rotation of motor 61 and energization from left to right is assumed to cause a clockwise rotation. In connection with motor 61' and amplidyne generator field 74' of Fig. 3b the same convention is observed as for the corresponding elements in Fig. 1b.

With the stated conventions in mind the operation of the load balance relays 232 and 232' will be briefly tabulated for unbalance of load on the respective electronic converters 9 and 9'. The relays are connected to close their contacts as follows:

Power flow 60 cycle system to 25 cycle system
Converter 9 carrying greater load

Relay 232 contacts 246—248 closed, contacts 246—247 open
Relay 232' contacts 246'—247' closed, contacts 246'—248' open Converter 9' carrying greater load Relay 232 contacts 246—247 closed, contacts 246—248 open
Relay 232' contacts 246'—248' closed, contacts 246'—247' closed Power flow 25 cycle system to 60 cycle system
Converter 9 carrying greater load Relay 232 contacts 246—248 closed, contacts 246—247 open
Relay 232' contacts 246'—247' closed, contacts 246'—248' open Converter 9' carrying greater load Relay 232 contacts 246—247 closed, contacts 246—248 open
Relay 232' contacts 246'—248' closed, contacts 246'—247' open A study of Figs. 3a and 3b and the above tabulation will show that in all cases the relays 232 and 232' operate to balance the power flow for the two electronic converters. For example, assume that power flow is from the 60 cycle to the 25 cycle system and that converter 9 is carrying the greater load. This requires that relay 232 reduce the load of converter 9 and increase the load of converter 9'. For the assumed direction of power flow and reversed convention for the control apparatus of Fig. 3a, motor 61 will be required to rotate in a clockwise direction which requires that field winding 74 be made negative at the right-hand terminal. When relay 232 moves to close its "lower" contacts 246—248, relay 109 is picked up and connects the right-hand terminal of field winding 3 to the negative conductor of bus 84 thereby reducing the power flow of converter 9. At the same time, relay 232' moves to close its "raise" contacts 246'—247' which effects a clockwise rotation of motor 61' and thereby raises the power flow through converter 9'. When the load on the two electronic converters becomes balanced, the relays 232 and 232' open their contacts and the contact arms "float" in the neutral position. The "demand load regulator" 78 functions to control both converters in the manner described hereinbefore so as to maintain the net interchange of power at the desired value determined by the demand load setting.

While we have shown and described particular embodiments of our invention, it will be obvious to those skilled in the art that various changes and modifications may be made without departing from our invention and we, therefore, aim in the appended claims to cover all such changes and modifications as fall within the true spirit and scope of our invention.

What we claim as new and desire to secure by Letters Patent of the United States is:

1. In an electronic conversion system, a pair of circuits one of which is an alternating current circuit, means comprising electric translating apparatus interconnecting said circuits and comprising a plurality of electronic tubes each having an anode, a cathode and a control electrode, means having a rotatable element for controlling the potential of said control electrode to determine the instant of conduction between the anode and cathode of each tube, a direct current motor connected to operate said movable element, a direct current generator of the armature reaction-excited type connected to energize said motor and having a pair of short circuit brushes and a pair of load circuit brushes displaced therefrom, a control field winding for said generator, and means connected to said control field winding and responsive to an electrical condition of said conversion unit for controlling the power interchanged between said pair of circuits.

2. In an electronic conversion system, a pair of circuits one of which is an alternating current circuit, means comprising electric translating apparatus interconnecting said circuits and comprising a plurality of electronic tubes each having an anode, a cathode and a control electrode, means having a rotatable element for controlling the potential of said control electrode to determine the instant of conduction between the anode and cathode of each tube, a direct current motor connected to operate said movable element, a direct current generator of the armature reaction excited type connected to energize said motor and having a pair of short circuit brushes and a pair of load circuit brushes displaced therefrom, a control field winding for said generator, and means for selectively varying the polarity of the voltage of said generator for operating said motor in either direction of rotation comprising means for reversibly energizing said control field winding.

3. In combination, a pair of electric circuits, means interconnecting said circuits and comprising a movable element operable from a first predetermined position to a second predetermined position in one direction of rotation for effecting a change in one sense between an electrical condition of said circuits and operable from said first predetermined position to a third predetermined position in the opposite direction of rotation for effecting a change in the opposite sense between said electrical condition of said circuits, a direct current motor reversible in its direction of rotation for operating said movable element, a reversible polarity direct current generator provided with a control field winding and connected to energize said motor, a source of direct current voltage for energizing said control field winding, means for reversing the polarity of the energization of said control field winding from said source, and means for selectively determining the extent and direction of rotation of said motor in accordance with the position of said movable element.

4. In combination, a pair of electric circuits, phase shifting means interconnecting said circuits and comprising a movable element operable from a first predetermined position to a second predetermined position in one direction of rotation for effecting a change in phase in one sense between the voltage of said circuits and operable from said first predetermined position to a third predetermined position in the opposite direction of rotation for effecting a change in phase in the opposite sense between the voltages of said circuits, a direct current motor reversible in its direction of rotation for operating said movable element, a reversible polarity direct current generator provided with a control field winding and connected to energize said motor, a source of direct current voltage for energizing said control field winding, means for reversing the polarity of the energization of said control field winding from said source, and means operated by said motor for selectively determining the extent and direction of rotation of said motor in accordance with the position of said movable element.

5. In a control system, a dynamo-electric machine, a control field winding therefor having two terminals, means for energizing said field winding comprising a source of unidirectional voltage having positive and negative terminals and an intermediate terminal, means comprising a two-branch circuit for interconnecting one terminal of said field winding to said intermediate terminal and having in one branch a circuit interrupting device and a unidirectional conducting device poled in a direction for current flow through said field winding in one direction and having in the other branch a circuit interrupting device and a unidirectional conducting device poled in a direction for current flow through said field winding in the opposite direction, and means for selectively connecting the other terminal of said field winding to the positive or negative terminal of said unidirectional source.

6. In a control system, a direct current generator having a control field winding provided with two terminals, means for energizing said field winding comprising a source of unidirectional voltage having positive and negative terminals and an intermediate terminal, means comprising a two-branch circuit for interconnecting one terminal of said field winding to said intermediate terminal and having in one branch a circuit interrupting device and a unidirectional conducting device poled in a direction for current flow through said field winding in one direction and having in the other branch a circuit interrupting device and a unidirectional conducting device poled in a direction for current flow through said field winding in the opposite direction, means for selectively connecting the other terminal of said field winding to the positive or negative terminal of said unidirectional source, and means for selectively controlling said circuit interrupting devices.

7. In a control system, a reversible polarity direct current generator having a separately energized control field winding, a direct current motor connected to be energized from said generator and having a direction of rotation dependent upon the polarity of said generator, means for energizing said field winding comprising a source of unidirectional voltage having positive and negative terminals and an intermediate terminal, means comprising a two-branch circuit for interconnecting one terminal of said field winding to said intermediate terminal and having in one branch a circuit interrupting device and a unidirectional conducting device poled in a direction for current flow through said field winding in one direction and having in the other branch a circuit interrupting device and a unidirectional conducting device poled in a direction for current flow through said field winding in the opposite direction, means for selectively connecting the other terminal of said field winding to the positive or negative terminal of said unidirectional source, means operative in response to the rotation of said motor in one direction for controlling said circuit interrupting device of said one branch, and means operative in response to the rotation of said motor in the other direction for controlling said circuit interrupting device of said other branch.

8. In a control system, a reversible polarity direct current generator having a separately energized control field winding, a direct current motor connected to be energized from said generator and having a direction of rotation dependent upon the polarity of said generator, means for energizing said field winding comprising a source of unidirectional voltage having positive and negative terminals and an intermediate terminal, means comprising a two-branch circuit for interconnecting one terminal of said field winding to said intermediate terminal and having in one branch a circuit interrupting device and a unidirectional conducting device poled in a direction for current flow through said field winding in one direction and having in the other branch a circuit interrupting device and a unidirectional conducting device poled in a direction for current flow through said field winding in the opposite direction, means comprising a pair of control circuits each having two circuits arranged for selectively connecting the other terminal of said field winding to the positive or negative terminal of said unidirectional source, means operative in response to the rotation of said motor in one direction for controlling said circuit interrupting device of said one branch during control of said motor in one direction for either corresponding circuit of said pair of control circuits, and means operative in response to the rotation of said motor in the other direction for controlling said circuit interrupting device of said other branch during control of said motor in the other direction for either of the other circuits of said pair of control circuits.

9. In a control system, a reversible polarity direct current generator having a separately energized control field winding, a direct current motor connected to be energized from said generator and having a direction of rotation dependent upon the polarity of said generator, means for energizing said field winding comprising a source of unidirectional voltage having positive and negative terminals and an intermediate terminal, means comprising a two-branch circuit for interconnecting one terminal of said field winding to said intermediate terminal and having in one branch a circuit interrupting device and a unidirectional conducting device poled in a direction for current flow through said field winding in one direction and having in the other branch a circuit interrupting device and a unidirectional conducting device poled in a direction for current flow through said field winding in the opposite direction, means comprising a pair of manual control circuits and a pair of automatically controlled circuits each having two circuits arranged for selectively connecting the other terminal of said field winding to the positive or negative terminal of said unidirectional source, means operative in response to the rotation of said motor in one direction for controlling the circuit interrupting device associated with the unidirectional conducting device transmitting current in one direction under either said manual or automatically controlled circuits, and means operative in response to the rotation of said motor in the other direction for controlling the circuit interrupting device associated with the unidirectional conducting device transmitting current in the other direction under either said manual or automatically controlled circuits.

10. In a control system, a direct current dynamoelectric machine having a plurality of control field windings each provided with two terminals, means for energizing said control field windings comprising a source of unidirectional voltage having positive and negative terminals and a terminal intermediate thereof, means comprising a two-branch circuit for interconnecting one terminal of all of said field windings to said intermediate terminal and having in one branch a unidirectional conducting device poled in a direction for current flow from said field windings to said intermediate terminal and having in the other branch a unidirectional conducting device poled in a direction for current flow from said intermediate terminal to said field windings, and means for reversing the current flow in the respective field windings comprising means connected to the other terminal of each field winding for selectively connecting said other terminals of its associated field winding to the positive or negative terminal of said source of unidirectional voltage.

11. In a control system, a direct current dynamoelectric machine having a plurality of control field windings each provided with two terminals, means for energizing said control field winding comprising a source of unidirectional voltage having positive and negative terminals and a terminal intermediate thereof, means comprising a two-branch circuit for interconnecting one terminal of all of said field windings to said intermediate terminal and having in one branch a unidirectional conducting device poled in a direction for current flow from said field windings to said intermediate terminal and having in the other branch a unidirectional conducting device poled in a direction for current flow from said intermediate terminal to said field windings, means for reversing the current flow in the respective field windings comprising a pair of control circuits connected to the other terminal of each field winding for selectively connecting said other terminals of its associated field winding to the positive or negative terminal of said source of unidirectional voltage, and adjustable resistance means connected in each circuit of at least one of said pair of control circuits.

12. In a control system, a direct current generator of reversible polarity having a plurality of control field windings each provided with two terminals, means for energizing said field windings comprising a source of unidirectional voltage having positive and negative terminals and an intermediate terminal, means comprising a two-branch circuit for interconnecting one terminal of each of said field windings to said intermediate terminal and having in one branch a unidirectional conducting device poled in a direction for current flow through each field winding in one direction and having in the other branch a unidirectional conducting device poled in a direction for current flow through said field windings in the opposite direction, and means for selectively connecting the other terminal of each field winding to the positive or negative terminal of said unidirectional source for reversing the polarity of said generator.

13. In a control system, a direct current generator of reversible polarity having a plurality of control field windings each provided with two terminals, means for energizing said field windings comprising a source of unidirectional voltage having positive and negative terminals and an intermediate terminal, means comprising a two-branch circuit for interconnecting one terminal of each of said field windings to said intermediate terminal and having in one branch a unidirectional conducting device poled in a direction for current flow through each field winding in one direction and having in the other branch a unidirectional conducting device poled in a direction for current flow through said field windings in the opposite direction, means comprising a pair of control circuits for selectively connecting the other terminal of each field winding to the positive or negative terminal of said unidirectional source for reversing the polarity of said generator, and adjustable resistance means connected in each circuit of said pair of control circuits.

14. In combination, a reversible polarity direct current generator having a separately energized control field winding, a direct current motor connected to be energized from said generator and being operable in opposite directions of rotation in dependence upon the polarity of said generator, a source of voltage for energizing said field winding, means for selectively energizing said field winding from said source for reversing the polarity of said generator, and adjustable means in circuit with said last mentioned means for causing operation of said motor at different speeds for opposite directions of rotation.

15. In combination, a rotatable element for controlling an electrical condition of an electric circuit, a reversible electric motor for operating said rotatable element in opposite directions from a predetermined neutral position for effecting the controlling action of said rotatable element, a generator provided with a control field winding and having one polarity or the reverse thereof in dependence upon the direction of energization of said control field winding, said generator being connected to energize said motor, means for reversibly energizing said control field winding, and means responsive to interruption of current flow in said electric circuit for causing energization of said field winding in a direction to return said rotatable element to said neutral position.

16. In combination, an electric circuit, circuit interrupting means connected in said electric circuit, means for controlling an electrical condition of said electric circuit comprising a rotatable element, a reversible electric motor for operating said rotatable element in opposite directions from a predetermined neutral position for effecting the controlling action of said rotatable element, a generator provided with a control field winding and having one polarity or the reverse thereof in dependence upon the direction of energization of said control field winding, said generator being connected to energize said motor, means for selectively energizing said control field winding in one direction or the other, and means operative in response to operation of said circuit interrupting means to interrupt said electric circuit for causing energization of said field winding in a direction to return said rotatable element to said neutral position from its position in either direction from said neutral position.

17. In combination, a rotatable element for controlling an electrical condition of an electric circuit, said rotatable element having a neutral position intermediate limit control position for either direction of rotation from said neutral position, a reversible electric motor for operating said rotatable element in opposite directions from said neutral position, a generator provided with a control field winding and having one polarity or the reverse polarity in dependence upon the direction of energization of said control field winding, a first pair of switching means connected in circuit with one terminal of said field winding for selectively connecting said one terminal for energization in one direction or in the reverse direction in dependence upon the direction of rotation of said rotatable element from said neutral position, a second pair of switching means connected to said other terminal of said control field winding for interrupting the circuit of said control field winding upon operation of said rotatable element to either one of its limit control positions, means responsive to interruption of current flow in said electric circuit for causing energization of said field winding in a direction to return said rotatable element to said neutral position, and means controlled by said first pair of switching means for interrupting current flow in said control field winding upon arrival at said neutral position from either direction of travel therefrom.

18. In combination, a pair of alternating current circuits, power conversion apparatus interconnecting said alternating current circuits, means for controlling the power flow through said conversion apparatus, means including a watt responsive device connected to be responsive to the power flow through said conversion apparatus and having a control element for effecting a controlling action in opposite senses when the power flow in a given direction through said conversion apparatus is above or below a predetermined value, and means for controlling said first mentioned means in accordance with the operation of said control element.

19. In combination, a pair of alternating current circuits, power conversion apparatus interconnecting said alternating current circuits, means for controlling the power flow through said conversion apparatus, means including a watt responsive device connected to be responsive to the power flow through said conversion apparatus and having a control element for effecting a controlling action in opposite senses when the power flow in a given direction through said conversion apparatus is above or below a predetermined value at which said control element is inactive, means for calibrating said watt responsive device to establish the predetermined value of power flow at which said control element is inactive, means for changing the setting of said calibrating means, and means for controlling said first mentioned means in accordance with the operation of said control element.

20. In combination, a pair of alternating current circuits, power conversion apparatus interconnecting said alternating current circuits, means for controlling the power flow through said conversion apparatus, means including a watt responsive device connected to be responsive to the power flow through said conversion apparatus and having a control element actuated thereby for effecting a controlling action in opposite senses when power flow in a given direction through said conversion apparatus is above or below a predetermined value at which said control element is inactive, means for calibrating said watt responsive device to establish the predetermined value of power flow at which said control element is inactive, means for indicating the calibration of said watt responsive device, means for changing the setting of said calibrating means in accordance with the indication of said indicating device, and means for controlling said first mentioned means in accordance with the operation of said control element.

21. In combination, a pair of alternating current circuits, reversible power conversion apparatus interconnecting said alternating current circuits, means for controlling the power flow through said conversion apparatus, means including a watt responsive device connected to be responsive to the power flow through said conversion apparatus and having a torque producing element and a control element actuated thereby for effecting a controlling action in opposite senses when the power flow through said conversion apparatus is above or below a predetermined value, means for maintaining the torque of said watt responsive device in the same direction irrespective of the direction of power flow, and means for controlling said first mentioned means in accordance with the operation of said control element above or below said predetermined value during either direction of power flow.

22. In combination, a pair of alternating current circuits, reversible power conversion apparatus interconnecting said alternating current circuits, means for controlling the power flow through said conversion apparatus, manual means interconnected with said first mentioned means for selecting the direction of power flow through said conversion apparatus and varying said power flow in either direction, automatic means including a wattmeter device connected to be responsive to the power flow through said conversion apparatus above or below a predetermined value for controlling said first mentioned means, and means for transferring the control of said first mentioned means from said manual means to said automatic means or vice versa.

23. In combination, a pair of alternating current circuits, a pair of power conversion units interconnecting said alternating current circuits, means for controlling the power flow through each of said conversion units, means including a pair of watt responsive devices arranged one with each of said power conversion units and each watt responsive device being connected to be responsive to the power flow through its associated conversion unit, each watt responsive device being provided with a control element for effecting a controlling action in opposite senses when the power flow in a given direction through its associated conversion unit is above or below a predetermined value at which said control element is inactive, calibrating means connected to each watt responsive device to establish the predetermined value of power flow at which the control element of its associated device is inactive, adjustable means associated with each of said calibrating means for changing the setting thereof, means for simultaneously adjusting said adjustable means, and means associated with each of said watt responsive devices for controlling said first mentioned means in accordance with the operation of the control element of its associated watt responsive device.

24. In combination, a pair of alternating current circuits, a pair of power conversion units interconnecting said alternating current circuits, means for controlling the power flow through each of said conversion units, means including a pair of watt responsive devices arranged one with each of said power conversion units and each watt responsive device being connected to be responsive to the power flow through its associated conversion unit, each watt responsive device being provided with a control element for effecting a controlling action in opposite senses when the power flow in a given direction through its associated conversion unit is above or below a predetermined value at which said control element is inactive, adjustable means connected to each watt responsive device for adjusting the ratio of power flow of said pair of conversion units, and means associated with each of said watt responsive devices for controlling said first mentioned means in accordance with the operation of the control element of its associated watt responsive device.

25. In an electric power system, a load circuit, a first alternating current system constituting a principal source of energy connected to energize said load circuit, a supplementary source of energy also connected to energize said load circuit, a second alternating current system, a second supplementary source of energy connected to energize said load circuit and comprising a power conversion unit interconnecting said second alternating current system and said load circuit, means for varying the power flow in either direction through said conversion unit, said principal source and two supplementary sources of energy being connected at a common tie point for jointly energizing said load circuit, an integrating demand measuring instrument connected at said tie point to be energized in accordance with the net interchange of energy between said principal source and said supplementary sources, said measuring instrument being provided with a control element, and means controlled by said control element for controlling said first mentioned means to cause said conversion unit to transmit power from said second alternating current system to said first alternating current system when the energy demand of said load is above said predetermined value and to transmit power in the reverse direction when the energy demand of said load is below said predetermined value.

26. In an electric power system, a load circuit, a first alternating current system of one frequency constituting a principal source of energy connected to energize said load circuit a supplementary source of energy of the same frequency as said first alternating current system connected to energize said load circuit, a second alternating current system of a different frequency than said first alternating current system, a second supplementary source of energy connected to energize said load circuit and comprising an electronic power conversion unit interconnecting said second alternating current system and said first alternating current system, means for varying the power flow in either direction through said conversion unit, said principal source and said two supplementary sources being connected at a common tie point for jointly energizing said load circuit, an integrating demand measuring instrument connected at said tie point to be energized in accordance with the net interchange of energy between said principal source and said supplementary sources, said measuring instrument being provided with a movable control element constrained to a neutral position for a predetermined value of said net interchange of energy and operated to one or the other of two controlling positions when the net interchange of energy is above or below said predetermined value, and means operative in response to movement of said movable control element to one or the other of its controlling positions for controlling said first mentioned means to cause said converter unit to transmit power from said second alternating current system to said first alternating current system when the energy demand of said load is above said predetermined value and to transmit power in the reverse direction when the energy demand of said load is below said predetermined value.

27. In combination, a pair of alternating current circuits, a pair of parallel connected power conversion units interconnecting said alternating current circuits, means arranged with each of said conversion units for controlling the power flow through its associated conversion unit, means including a pair of watt responsive devices arranged one with each of said power conversion units and each watt responsive device being connected to be responsive to the difference in power transmitted by the respective units of said pair of conversion units, and circuit controlling means for each watt responsive device having an inactive position when the watts of the respective conversion units are in a predetermined ratio and each having one or the other of two control positions for controlling the first mentioned means of its associated conversion unit to increase or decrease the power flow of its associated conversion unit in dependence upon the direction of departure of watts in the respective conversion units from said predetermined ratio.

28. In combination, a pair of alternating current circuits, a first and second power conversion unit connected in parallel relation between said alternating current circuits, means for controlling the power flow through said first conversion unit, means for controlling the power flow through said second conversion unit, a first watt responsive device including a current coil connected to be energized in accordance with the differential current of the respective conversion units and a voltage coil energized in accordance with the voltage of one of said circuits, a second watt responsive device including a current coil connected to be energized in accordance with the differential current of the respective conversion units and a voltage coil energized in accordance with the voltage of said one of said circuits, a movable contact arm arranged to be operated by said first watt responsive device from an inactive circuit controlling position for a predetermined ratio of watts in the respective conversion units to one or the other of two active circuit controlling positions in dependence upon the magnitude and direction of the differential watts of said first watt responsive device, means operative in response to movement of said contact arm to either one of its active circuit controlling positions for controlling said first mentioned means, a movable contact arm arranged to be operated by said second watt responsive device from an inactive circuit controlling position for the said predetermined ratio of watts in the respective conversion units to one or the other of two active circuit controlling positions in dependence upon the magnitude and direction of the differential watts of said second watt responsive device, and means operative in response to movement of the contact arm of said second watt responsive device to either one of its active circuit controlling positions for controlling said second mentioned means.

29. In an electric power system, a load circuit, a first alternating current system constituting a principal source of energy connected to energize said load circuit, a supplementary source of energy also connected to energize said load circuit, a second alternating current system, a second supplementary source of energy connected to energize said load circuit and comprising a pair of power conversion units connected in parallel relation between said second alternating current system and said load circuit, means for varying the power flow in either direction through said conversion units, said principal source and two supplementary sources of energy being connected at a common tie point for jointly energizing said load circuit, an integrating demand measuring instrument having voltage and current coils connected at said tie point to be energized in accordance with the net interchange of energy between said principal source and said supplementary sources, said measuring instrument being provided with a control element, means controlled by said control element for simultaneously controlling said first mentioned means to cause said conversion units jointly to transmit power from said second alternating current system to said first alternating current system when the energy demand of said load is above said predetermined value and to transmit power in the reverse direction when the energy demand of said load is below said predetermined value, and means associated with each of said conversion units and responsive to the ratio of load transmitted by the respective conversion units for modifying said first mentioned means to adjust the loading between said conversion units to a predetermined ratio.

30. In combination, a supply circuit, a load circuit, electric translating apparatus connected between said circuits and including electronic means having an anode, a cathode and a control member, an excitation circuit comprising a source of alternating current connected to energize said control member, circuit interrupting means connected between one of said circuits and said electric translating apparatus, means responsive to an abnormal operating condition of said electric translating apparatus for causing deenergization of said control member, and means for causing said circuit interrupting means to disconnect said electric translating apparatus from one of said circuits after a predetermined number of operations of said last mentioned means in a predetermined period of time.

31. In combination, a supply circuit, a load circuit, electronic power conversion apparatus connected between said circuits and comprising electronic means of the type employing an ionizable medium and including an anode, a cathode and an arc-initiating control member, an excitation circuit connected to said control member and comprising a source of alternating current and an inductive device interposed between said source and said control member for transmitting electrical impulses thereto, means for controlling said inductive device to prevent the application of electrical impulses thereto, circuit interrupting means connected between said supply circuit and said power conversion apparatus, means responsive to an abnormal current condition of said power conversion apparatus for causing operation of said first mentioned means, and means for causing said circuit interrupting means to disconnect said supply circuit from said power conversion apparatus after said first mentioned means has performed a predetermined number of its circuit controlling operations in a predetermined period of time.

32. In combination, a pair of alternating current circuits, electronic power conversion apparatus connected between said circuits and comprising two electronic conversion units, each unit being operable as a rectifier or an inverter, a direct current circuit interconnecting said units, each conversion unit also comprising electronic means of the type employing an ionizable medium and including an anode, a cathode and an arc-initiating control member, a source of excitation, means including a transformer for interconnecting said source and said control member for supplying thereto electrical impulses for initiating an arc between said anode and cathode, shunting means for rendering said transformer ineffective, a circuit breaker connected between each conversion unit and its associated alternating current circuit and each circuit breaker being provided with a circuit opening control circuit, means responsive to alternating current above a predetermined value transmitted to a conversion unit when operating as a rectifier from its associated alternating current circuit, means responsive to the current of said direct current circuit above a predetermined value, relay means responsive to the operation of either of said two last mentioned means for operating said shunting means, and means for energizing one of said circuit opening control circuits to cause opening of its associated circuit breaker after said shunting means has been operated a predetermined number of times in a predetermined period of time.

WILLIAM N. GITTINGS.
AMOS W. BATEMAN.